United States Patent
Schultz

[19]

[11] Patent Number: 6,018,522
[45] Date of Patent: Jan. 25, 2000

[54] METHOD FOR PROVIDING DATA FROM AN INFORMATION NETWORK TO SUBSCRIBERS OF A COMMUNICATION SYSTEM

[75] Inventor: Charles P. Schultz, Hialeah, Fla.

[73] Assignee: Motorola, Inc., Schaumburg, Ill.

[21] Appl. No.: 08/792,410

[22] Filed: Feb. 3, 1997

[51] Int. Cl.[7] .................................................. H04L 12/28
[52] U.S. Cl. ......................... 370/351; 370/431; 370/486; 455/5.1
[58] Field of Search ................... 340/825.04; 370/351, 370/352, 353, 354, 356, 310, 329, 341, 431, 468, 486; 455/412, 517, 31.3, 3.1, 5.1

[56] References Cited

U.S. PATENT DOCUMENTS

| | | | |
|---|---|---|---|
| 5,001,330 | 3/1991 | Snowden et al. | 340/825 |
| 5,010,330 | 4/1991 | Snowden et al. | 340/825 |
| 5,555,446 | 9/1996 | Jasinski | 455/54.2 |
| 5,615,210 | 3/1997 | Kaiyama et al. | 370/389 |
| 5,809,415 | 9/1998 | Rossman | 370/383 |
| 5,862,480 | 1/1999 | Wild et al. | 455/432 |
| 5,892,905 | 4/1999 | Brand et al. | 395/187.01 |

OTHER PUBLICATIONS

"WebPhone" product literature, NetSpeak Corporation, 1996.

*Primary Examiner*—Hassan Kizou
*Assistant Examiner*—Daniel Previl
*Attorney, Agent, or Firm*—Andrew S. Fuller

[57] ABSTRACT

A communication system (101) interfaces to an information network (140) through provider equipment (110, 130) to provide data to subscriber units (120, 125). A request is received (410) at the provider equipment (110, 130) from a subscriber unit (120) for streamed data sourced on the information network. The provider equipment determines (420) whether this data corresponds to a request that is currently being serviced on a particular communication channel accessible to the subscriber unit. When such is the case, the request is satisfied by communicating (425) a designator for this channel to the subscriber unit. Otherwise, the provider equipment accesses (430) the information network to obtain (440) the data, and communicates (450, 460) a designated channel to the subscriber unit for receipt of this data. The provider equipment then couples the data from the information source and transmits (470) this data on the designated channel.

11 Claims, 4 Drawing Sheets

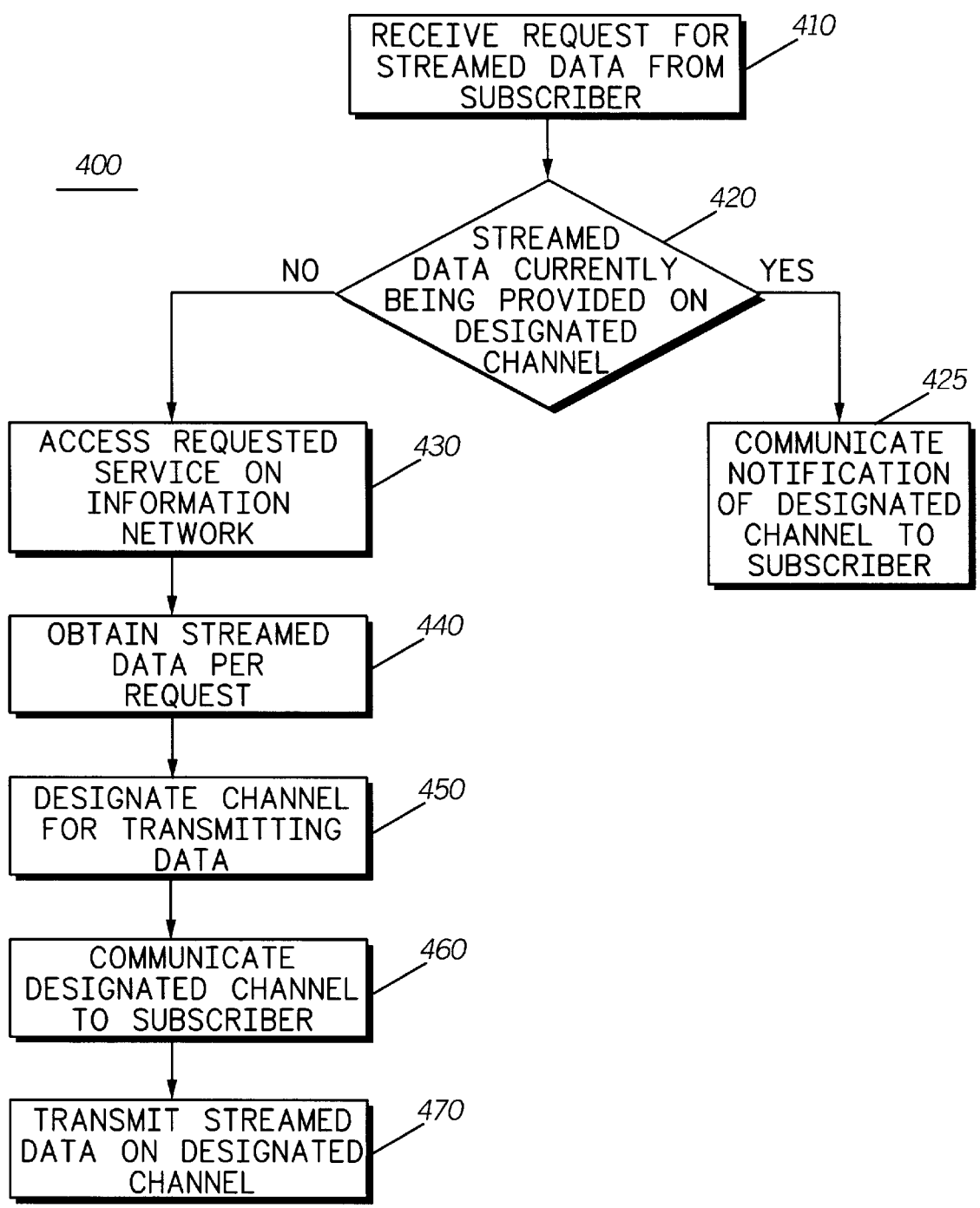

METHOD FOR PROVIDING DATA FROM AN INFORMATION NETWORK TO SUBSCRIBERS OF A COMMUNICATION SYSTEM

TECHNICAL FIELD

This invention is related to communication systems, and more particularly to the accessing of externally sourced information from subscriber units operating within a radio communication system.

BACKGROUND OF THE INVENTION

Radio communication devices, particularly hand-held two-way radios, portable telephones, and pagers, are fast becoming a staple of modern society. It is not uncommon to have one or more of such devices on one's person in order to maintain vital communication links. There has been an increased desire to have the functions provided by such devices integrated into a single device, and for the single device to provide access to a variety of information sources in addition to its basic communication functions. For example, it is known in the art to provide a one-way radio device, such as a pager, with periodic broadcasts of information from a variety of sources, in addition to standard paging functions. This type of information is generally available to communication devices that support paging services.

While broadcast service is satisfactory for the information requirements of some, the need for customized information has made such service inadequate for others. For many, it is essential to have ready access to a wide array of information sources available through public or private access networks. Although such access is common for users of networked computing devices, these information sources have traditionally not been available to users of radio communication devices used primarily for voice communications. Radio communication devices tend to be designed for operation in tightly coupled systems using narrow band and low bandwidth channels. These channels represent communication resources that must be carefully managed to ensure delivery of high priority functions.

With the increasing demand for integrated services, it is desirable to provide access to data on external information networks for a two-way communication device operating within a tightly coupled radio communication system. Such access should be provided in a manner that facilitates ease of use and that minimizes impact on higher priority functions of the communication system.

BRIEF DESCRIPTION OF THE DRAWINGS

FIG. 4 is a flowchart of procedures for provider equipment within the radio communication environment of FIG. 1, in accordance with the present invention.

DETAILED DESCRIPTION OF THE PREFERRED EMBODIMENT

The present invention provides a method for obtaining data from an information network for subscribers of a communication system. The communication system includes infrastructure or provider equipment that provides system controller functions for communication devices operating as subscriber units. The provider equipment interfaces to an information network through gateway equipment such that subscriber units may access audio, video, data, and related services on the information network from within the radio communication system. At the provider equipment, a request for streamed data sourced on the information network is received from a subscriber unit. When the data corresponds to a request that is currently being serviced on a particular communication channel accessible to the subscriber unit, the request is satisfied by communicating a designator for this channel to the subscriber unit. Otherwise, the provider equipment accesses the information network to obtain the data, and communicates a designated channel to the subscriber unit for receipt of this data. The provider equipment then couples the data from the information source and transmits this data on the designated channel.

Figure 1:
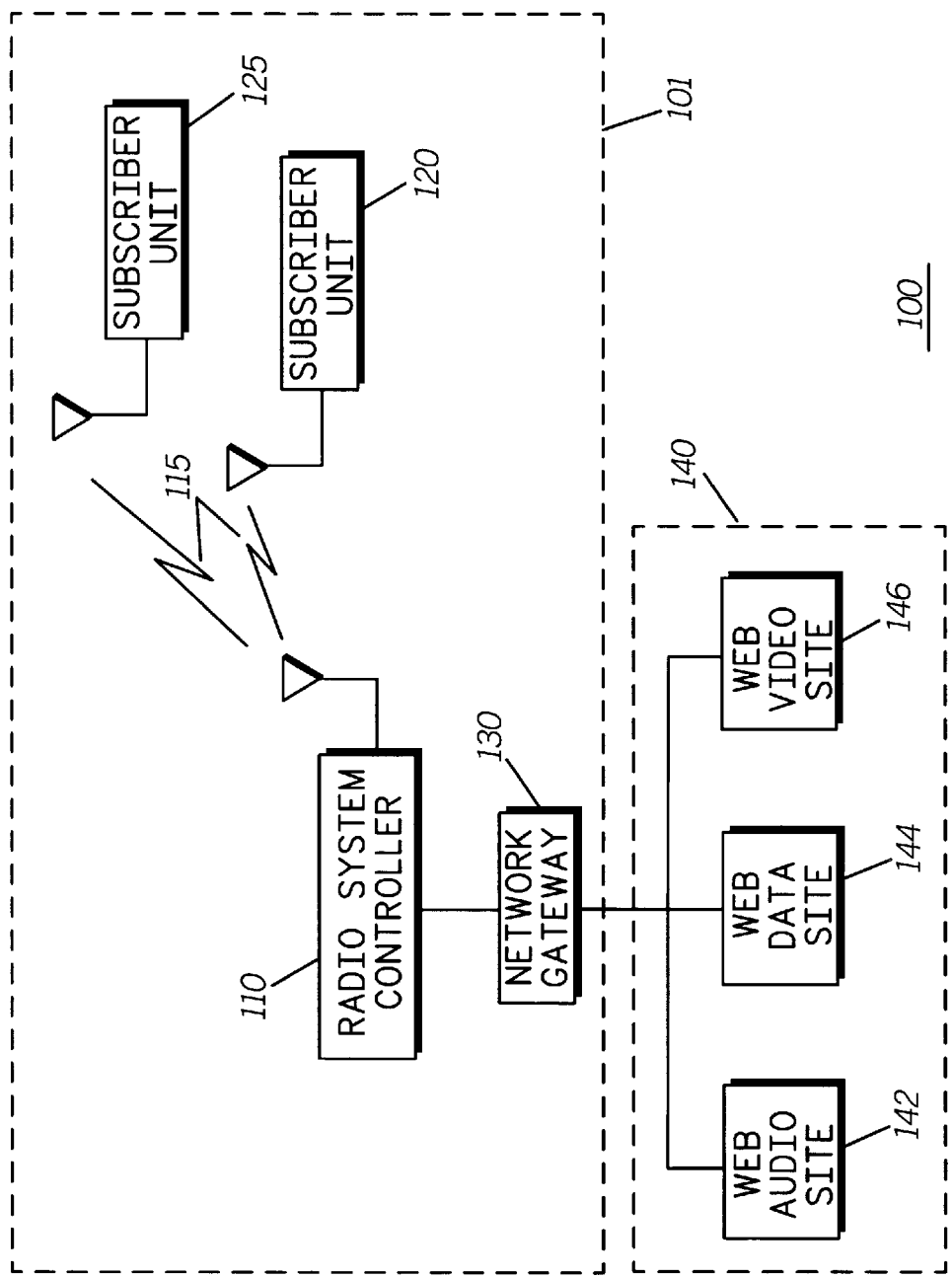
FIG. 1 is a block diagram of a radio communication environment, in accordance with the present invention.

FIG. 1 shows a block diagram of a communication environment 100, in accordance with the present invention. The communication environment 100 includes a two-way radio communication system 101 that is interfaced to an information network 140. The radio communication system 101 has a radio system controller 110, subscriber units 120, 125, and a network gateway 130. The radio system controller 110 and network gateway 130 together form provider equipment that performs operation and access control for the subscriber units 120, 125. The radio system controller 110 is preferably implemented using fixed infrastructure communication equipment, and in the preferred embodiment includes a trunked system controller with a well-known operation. The subscriber units 120, 125 are radio communication devices that interface with the radio system controller via wireless communication links 115 to provide two-way communication services. The subscriber units can be portable or mobile radio telephones which work in conjunction with the provider equipment 110, 130 to provide a user with services such as telephone interconnect, paging, or short message service, dispatch or instant conferencing, and other data services. The network gateway 130 can be implemented using a computing device having networking capabilities and interconnected with the information network 140 via trunked telephone lines, a wide area network link or other communication link. The network gateway 130 may perform additional data conversion functions where necessary. For example, when the radio communication system 101 supports primarily analog communications, the network gateway 130 may convert network formatted digital data into analog data for ultimate transmission to a subscriber unit.

The information network 140 may be a pubic access network, such as the internet or a private access network, such as an intranet or other private data network. In the preferred embodiment, the information network comprises a number of world wide web or internet sites, including a web audio site 142, a web data site 144, a web video site 146, that function as information sites. The network gateway 130 accesses a particular information site 142, 144, 146 to obtain a requested service according to the present invention. The requested service preferably consists of streamed data, i.e., continuous or periodic transmissions of information, such as the broadcasting of audio information, video information, and the like, which information is continually fed for an extended period of time.

Figure 2:
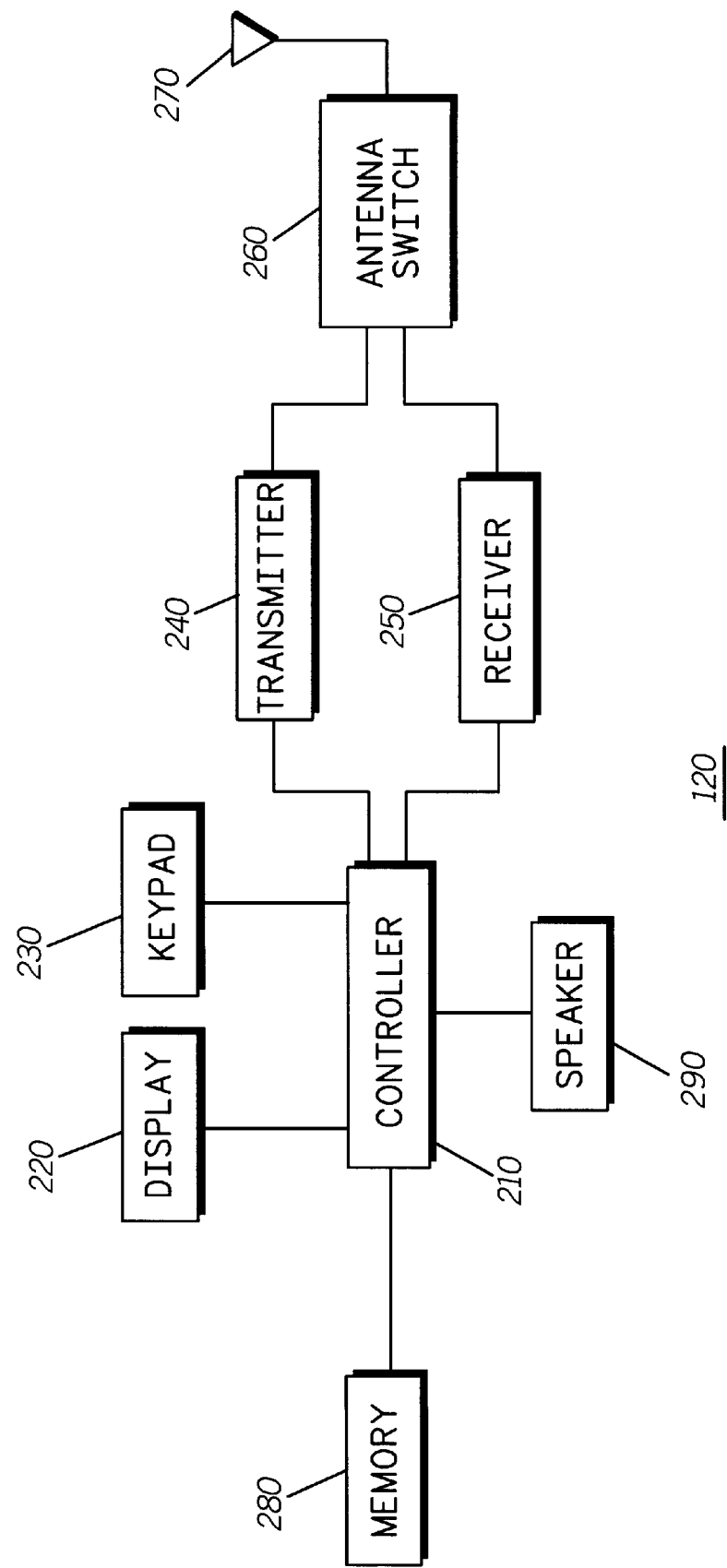
FIG. 2 is a block diagram of a radio communication device operating within the radio communication environment of FIG. 1, in accordance with the present invention.

FIG. 2 shows a block diagram of a communication device, such as subscriber unit 120, in accordance with the present invention. Other subscriber units 125 are similarly constructed. The communication device 120 is operable to access streamed data on a designated communication channel, and for presenting such data to a user. The communication device 120 is preferably a two-way radio or radio telephone that is operable to provide telephone interconnect, paging, dispatch, and data services. In the radio 120, a controller 210 is coupled to a memory 280 to a transmitter 240 and to a receiver 250. The transmitter 240 and the receiver 250 are coupled via an antenna switch 260 to an antenna 270. For transmit operations, the controller 210 configures the antenna switch 260 to couple the transmitter 240 to the antenna 270. Similarly, for receive operations, the controller 210 couples the antenna 270 via the antenna switch 260 to the receiver 250. Receive and transmit operations are conducted under instructions stored in the memory 280. The radio 120 also includes a display 220, a key pad 230, and speaker 290, that together provide a user interface for accessing radio functions. According to the present invention, the radio allows a user to access information sourced in an external information network. The network access services are selectable using the user interface 220, 230, 290. The key pad 230 is used to initiate a request for a network access service, and the display 220 used to provide information having a video or text content, and the speaker 290 used to present information having an audio content.

Figure 3:
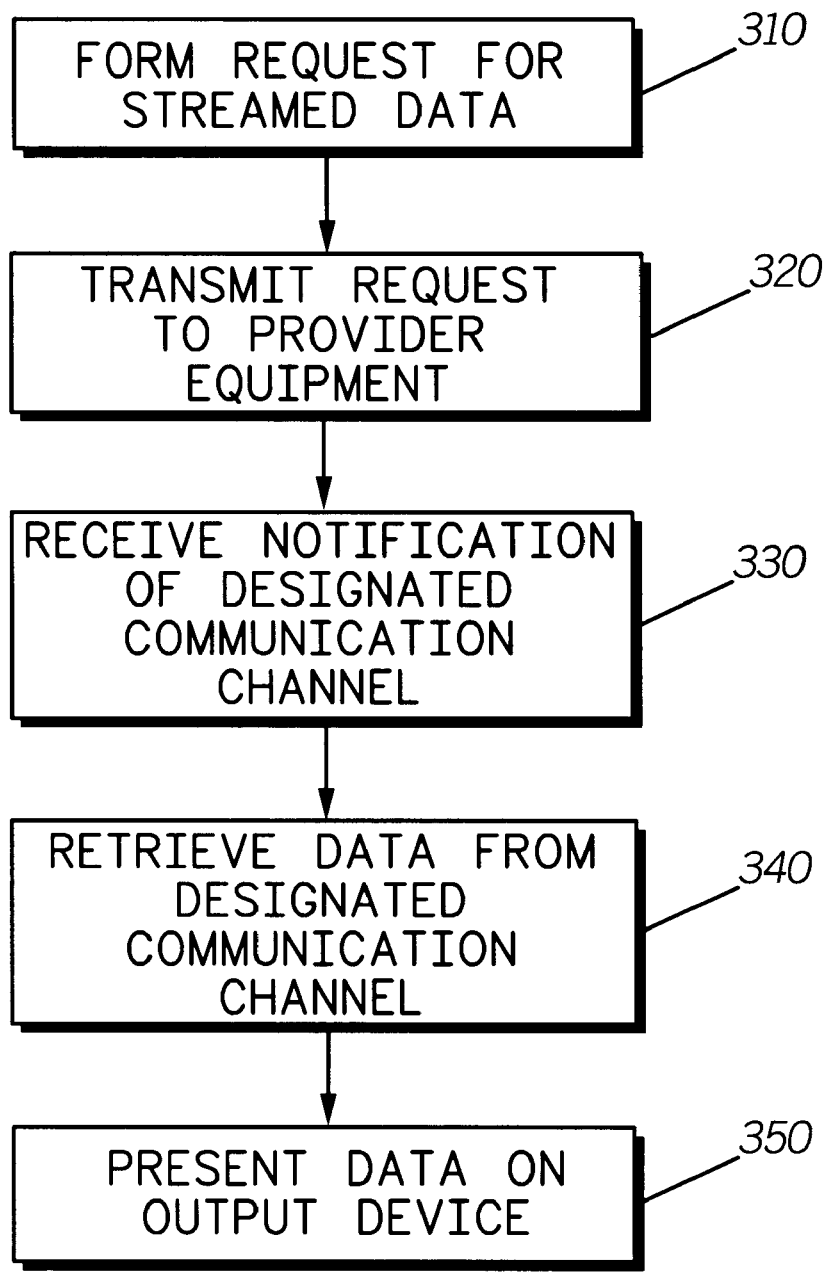
FIG. 3 is a flowchart of procedures for the radio communication device of FIG. 2, in accordance with the present invention.

FIG. 3 shows a flowchart of procedures 300 used at the communication device 120, 125 to access network services, in accordance with the present invention. Ordinarily, a user operates the communication device to display a list of selectable options for network access, such as to receive a particular audio service, video service, or similar data service for which streamed data is provided. The communication device identifies a selected operation and forms a request for streamed data that is sourced on an information network, step 310. The request is then transmitted via a wireless communication channel to the provider equipment, step 320. In a typical example, the communication device processes a request for data from an internet web site that services requests for streamed data. The request contains sufficient information to identify a source for the information, and the type of information desired. The communication device then waits to receive notification of a designated communication channel on which the requested information will be provided. The communication device receives such notification, step 330, and retrieves the streamed data from the designated communication channel, step 340. The streamed data is then formatted and presented at an appropriate output device, step 350. In one embodiment, the streamed data represents audio that is presented in an appropriate form via a speaker.

FIG. 4 shows a flowchart of procedures 400 used at the provider equipment to satisfy network access requests from subscriber units, in accordance with the present invention. The provider equipment receives a request for streamed data sourced on the information network from a subscriber unit over a wireless radio communication channel, step 410. The request may correspond to audio data from a particular service provider on an information site on the internet. The provider equipment determines whether streamed data corresponding to the request is currently being provided on a communication channel accessible to the communication device. When such is the case, the provider equipment satisfies the request by communicating a designator for the particular communication channel to the subscriber unit, step 420, 425. For example, the request for data may correspond to a particular service provider that provides audio data via an internet information site. If such audio data is already coupled by the provider equipment and being transmitted on a designated channel, the provider equipment communicates notification of the designated channel to the subscriber unit.

When the data requested is not currently being provided on a communication channel accessible to the subscriber unit, the provider equipment accesses the information network through the network gateway to obtain the streamed data, steps 420, 430. A communication channel is then designated for transmitting the streamed data to the subscriber unit, and this designation communicated to the subscriber unit, steps 450, 460. The streamed data is obtained from the particular service provider and transmitted to the subscriber unit on the designated communication channel, steps 440, 470. On occasion, the provider equipment receives a second request from a second subscriber unit corresponding to the requested service being provided on a designated communication channel. The provider equipment satisfies this request by communicating the designated channel to the second subscriber unit, such that multiple subscriber units may access the streamed data on a particular communication channel. In the preferred embodiment, the subscriber unit interacts with the provider equipment to request streamed audio data from an internet site. The provider equipment connects to the internet site through the information gateway. When the provider equipment determines that there are no subscriber units accessing the streamed audio data on the designated radio communication channel, the provider equipment disconnects from the internet sites and releases the designated communication channel for other use in the system. Thus, the efficient use of system resources is promoted through the reuse of communication channels.

The present invention provides significant advantages over the prior art. Radio communication devices operating within a tightly coupled communication system are provided with access to data available on information networks, such as streamed audio data through a network gateway at the provider equipment. The provider equipment operates to husband precious communication resources by facilitating the sharing of communication channels among subscriber units having similar requests. Thus, flexible information access is provided without excessively taxing the communication resources within limited bandwidth systems.

What is claimed is:

1. In a communication system having provider equipment and a subscriber unit, a method comprising the steps of:

at the provider equipment:

receiving, from the subscriber unit over a communication channel, a request for streamed data from a source on an information network;

determining whether streamed data corresponding to the request is currently being provided on a communication channel accessible to the subscriber unit;

when streamed data corresponding to the request is currently being provided on a particular communication channel accessible to the subscriber unit, satisfying the request by communicating a designator for the particular communication channel to the subscriber unit;

when streamed data corresponding to the request is not currently being provided on a particular communication channel accessible to the subscriber unit:

accessing the information network to obtain the streamed data;

designating a communication channel for transmitting the streamed data to the subscriber unit;

communicating the designated communication channel to the subscriber unit; and transmitting streamed data from the requested service using the designated communication channel.

2. The method of claim 1, wherein the request contains information for accessing an internet information site.

3. The method of claim 2, wherein the step of accessing the information network comprises the step of communicating through a network gateway.

4. The method of claim 3, wherein the streamed data comprises audio information.

5. The method of claim 3, wherein the streamed data comprises video information.

6. The method of claim 3, further comprising the steps of:

at the subscriber unit:

forming the request for streamed data;

transmitting the request via a wireless communication channel to the provider equipment;

receiving notification of the designated communication channel;

retrieving the streamed data from the designated communication channel; and presenting the streamed data via an output device.

7. A method comprising the steps of, at a first two-way radio communication device:

forming a message for a requested service sourced on an information network;

transmitting the message via a wireless communication channel to a radio system controller;

at a radio system controller:

receiving the message from the wireless communication channel;

accessing the information network to obtain the requested service;

obtaining a designated radio channel for transmitting information corresponding to the requested service;

communicating the designated radio channel to the first two-way radio communication device;

transmitting streamed data from the requested service using the designated radio channel;

receiving a second request from a second two-way radio communication device corresponding to the requested service; and satisfying the second request by communicating the designated radio channel to the second two-way radio communication device.

8. In a wireless radio communication system having infrastructure communication equipment and first and second subscriber units, a method of providing audio data comprising the steps of:

receiving a first request from the first subscriber unit over a wireless communication channel, the first request corresponding to audio data from a service provider;

accessing the service provider to obtain the audio data;

obtaining a designated radio channel for transmitting the audio data to the first subscriber unit;

communicating the designated radio channel to the first subscriber unit;

transmitting audio data from the service provider using the designated radio channel;

receiving a second request from the second subscriber unit for audio data from the service provider; and satisfying the second request by communicating the designated radio channel to the second subscriber unit device.

9. The method of claim 8, wherein the first subscriber unit comprises a two-way radio telephone.

10. The method of claim 9, wherein the step of accessing comprises the step of connecting to an internet site to obtain the audio data.

11. The method of claim 10, further comprising the steps of, when there are no subscriber units accessing the audio data on the designated radio channel:

disconnecting from the internet site; and releasing the designated radio channel for other use.

\* \* \* \* \*